July 12, 1938.  J. M. SUMMERS  2,123,814

STOP AND WASTE VALVE

Filed March 1, 1937

John M. Summers
INVENTOR

BY Victor J. Evans & Co.
ATTORNEYS

Patented July 12, 1938

2,123,814

UNITED STATES PATENT OFFICE 2,123,814

STOP AND WASTE VALVE

John M. Summers, Russellville, Ala.

Application March 1, 1937, Serial No. 128,496

1 Claim. (Cl. 251—23)

This invention relates to valves, and its general object is to provide a valve or cock of the stop and waste type, for use with pipes either above or below the surface of the ground for draining the same to prevent freezing, that is capable of use for simultaneously opening the drain vent and shutting off the water from its source, and vice versa, therefore when the water from its source is passing through the valve, the drain vent is closed, but when the water is shut off the drain vent is open.

An important object is to provide a valve of the character set forth, that includes a valve head or plug that is swiveled to its stem, and can be readily secured or removed with respect thereto, but casual displacement or removal is impossible.

A further object is to provide a stop and waste valve, that is simple in construction, inexpensive to manufacture, easy to install, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
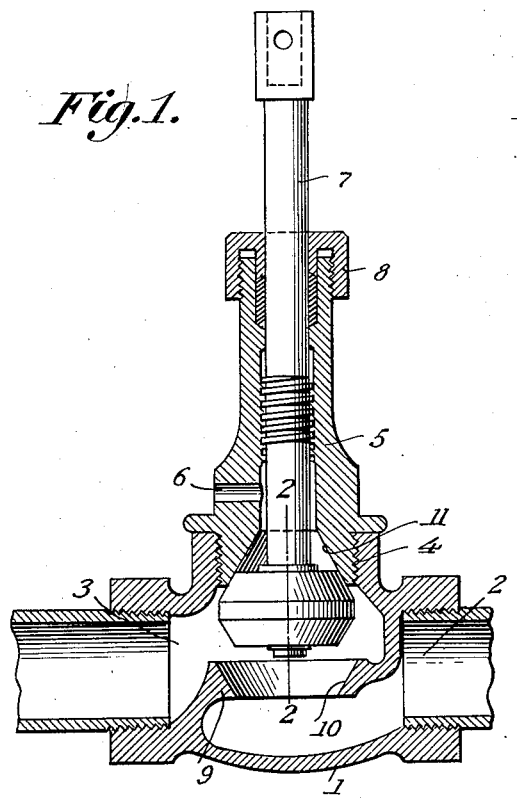
Figure 1 is a vertical sectional view taken through a valve constructed in accordance with the present invention with parts in elevation.

Referring to the drawing in detail, the reference numeral 1 indicates the body of the valve, which may be of any type and constructed in any manner, suitable for the purpose, but is shown as being of the compression type, and includes inlet and outlet ports 2 and 3 respectively, the ports being interiorly threaded to receive the pipes as shown, the pipe for the inlet port being in communication with a source of water supply, while the pipe of the outlet port is the one to be drained by my valve in a manner which will be later described.

The body includes an interiorly threaded neck 4 for threadedly receiving a bonnet 5 which has a drain vent or passage 6 therein, and the bonnet is interiorly threaded to threadedly receive a stem 7 that extends therethrough and is held associated therewith by a gland nut 8. It is of course understood, that the upper end of the stem is to have secured thereto, either a handle or an extension rod, it depending whether the valve is to be used below or above the surface of the ground, and while any suitable securing means may be employed for that purpose, I have shown a handle or extension rod receiving socket for the stem 7 of Figure 1, with an opening therein to receive a set screw or other suitable securing means.

Bridging the chamber formed by the hollow body 1 is a partition 9 disposed within the body in a manner to separate the inlet port from the outlet port, and the partition in the form as shown in Figure 1, includes a horizontal portion having an opening therein, that is provided with a conical seat 10 disposed in superposed relation with respect to and below a conical seat 11 formed in the lower end of the bonnet 5.

Figure 2:
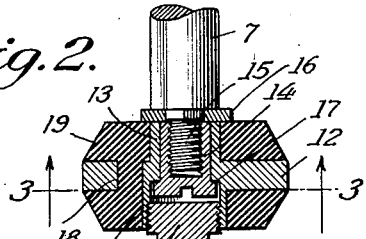
Figure 2 is a sectional view taken approximately on line 2—2 of Figure 1.
Figure 3:
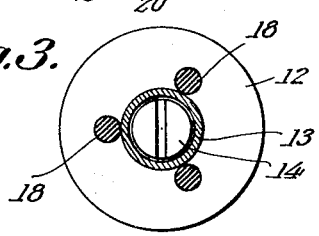
Figure 3 is a sectional view taken approximately on line 3—3 of Figure 2, looking in the direction of the arrows.

The valve head for the form of valve, shown in Figure 1 includes a disk body 12 provided with a central opening, and formed on the body are collars 13 extending from the opposite sides thereof to register with the central opening for the purpose of receiving a sleeve type headed screw or thimble 14 that is threaded on a stud 15 formed on and depending from the stem for securing the valve head thereto, as clearly shown in Figure 2. The stud at its juncture with the stem is square cornered and mounted on the square cornered portion to be held against turning thereby is a washer 16 which acts as the upper bearing for the valve head, while the lower bearing is provided by the head of the screw bolt or thimble, that is engageable with a shoulder 17 within the lower collar, with the result it will be seen that the valve head is secured to the stem for swivel movement.

The valve head in the form just described, is preferably molded into a single unit, and for that purpose the disk body is provided with openings 18, arranged outwardly beyond the central opening to receive material of a sectional washer or gasket 19 molded on the body and about the collars, and which may be made of rubber or any composition suitable for the purpose. In any event, the disk body 12 is disposed between the upper and lower sections of the gasket, and the upper section is beveled for fitting engagement with the conical seat 11, while the lower section is beveled in an opposite direction to fit the seat 10. A screw plug 20 may be secured within the lower collar to close the same and for disposal within the path of the screw bolt 14 to prevent removal thereof. The screw plug also tends to provide a water tight fitting.

From the foregoing, it will be obvious that when the valve head is seated as shown in Figure 1, the water from its source can freely pass through the valve, but when the head is lowered for disposal upon the seat 10, the passage of water through the valve is shut off, and water within the pipe connected to the outlet port is drained through the passage 6.

Figure 4:
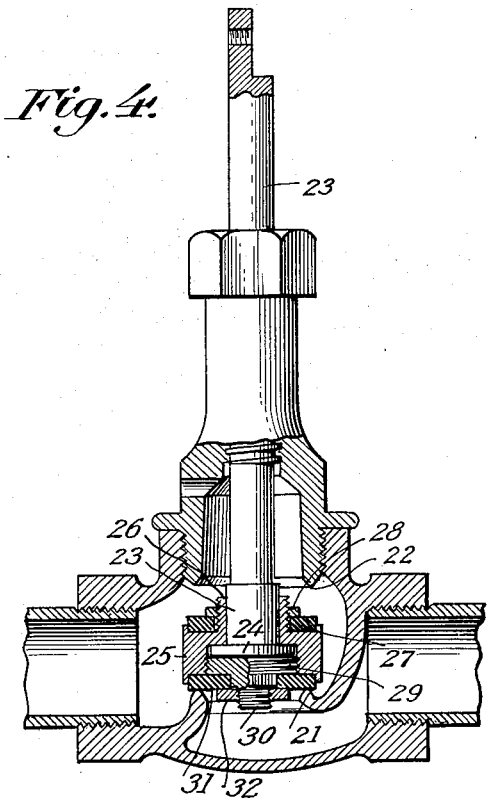
Figure 4 is a partial sectional view taken through a modified form of valve.

In the modified form, as shown in Figure 4, the partition within the body is provided with a beveled seat 21, and the bonnet has a like seat 22 on the lower end thereof, while the stem which is indicated by the reference numeral 23 is slightly enlarged at its lower end, with a disk portion 24 formed on the enlarged portion, as shown. The valve head of this form is mounted on the enlarged portion of the stem 23 and includes a ring like body 25 having an exteriorly threaded collar 26 formed on and rising therefrom to receive a washer or gasket 27 of rubber or other suitable composition and which is held against the upper surface of the body 25 and within an annular recess therein by a nut 28. The ring like body is provided with a recess extending in the lower end thereof to receive the disk portion 24, so that the body is seated thereon, and threaded within the recess is a plug member 29 having a threaded stud 30 depending therefrom. At the juncture of the stud with the plug member there is a square cornered portion that has mounted thereon a gasket 31 similar to the gasket 27 and the gasket 31 is held against the bottom of the body 25 and within an annular recess therein, by a nut 32 which is threaded on the stud 30 to bear against the gasket 31, as shown.

From the foregoing, and the disclosure of the form as shown in Figure 4, it will be obvious that the valve head of that form is swiveled on the disk portion 24 of the stem and is movable by the latter for disposing the same upon either the seats 21 or 22, and the gasket 27 is engageable with the seat 21, while the gasket 31 is engageable with the seat 22.

The stem 23 is shown as having a lateral recess in the upper end thereof, instead of the socket of the stem 7, it being apparent that the recessed upper end of the stem 23 is for receiving a handle or extension rod that is secured therein by suitable means threaded in the opening shown.

Figure 5:
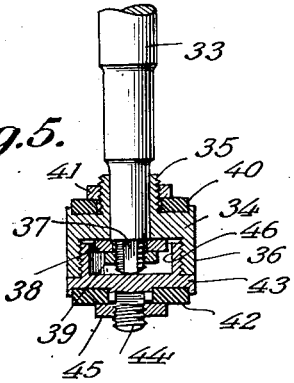
Figure 5 is a fragmentary view illustrating a further modified form of stem and valve head, with parts in section.
Figure 6:
Figure 6 is a detail perspective view of the washer for the form shown in Figure 5.

In Figure 5 I have illustrated a further modified form of valve stem and head, and the stem which is indicated by the reference numeral 33 is reduced in stepped formation. The valve head of this form likewise includes a ring like body 34 having a central opening therein for receiving the lowermost reduced portion of the stem, which extends through an exteriorly threaded collar 35 formed on and rising from the body. The lower portion of the body is recessed to provide a depending annular ring portion 36 which is interiorly threaded, and formed on the lower end of the stem 33 is a threaded stud 37 having diametrically opposed flat sides to receive a washer 38 for fitting association therewith, the stud extending into the recess, with the washer engageable with the underside of the recessed portion of the ring like body and held accordingly by a nut 39, therefore it will be seen that the head of this form is likewise swivelly mounted on the stem.

Surrounding the collar 35 and seated within a recess in the upper portion of the ring like body 34 is a gasket 40 which is held accordingly by a nut 41 threaded on the collar. The other gasket which is indicated by the reference numeral 42 is carried by a nipple member 43 and is seated in a recess in the lower portion thereof, as well as surrounds the enlarged inner end of a threaded stud 44 and held accordingly by a nut 45 on the stud. The nipple member includes an annular flange 46 that is exteriorly threaded to be received by the annular ring portion 36, and when the nipple is threaded to the body 34, as shown in Figure 5, the outer end of the stud 37 bears on the nipple which not only tends to prevent the nipple from becoming displaced or removed from the body, but likewise prevents removal of the nut 39.

It will be obvious that the form of head as shown in Figure 5 includes a pair of separable sections each of which has mounted thereon a gasket, the upper section being the ring like body 34 while the lower section is the nipple member 43. This form of valve head cooperates with seats similar to those shown in Figure 4, in that the gasket 40 can be engageable with the seat 22, while the gasket 42 can be engageable with the seat 21.

It is thought from the foregoing description that the advantages and novel features of the invention will be readily understood.

While I have illustrated and described several different means for swivelly connecting the valve heads to their stems, I want it understood that other means may be employed for that purpose, and that changes may be made in the construction and in the combination and arrangement of the several parts of the valve, provided that such changes fall within the scope of the appended claim.

What I claim is:

A stop and waste valve comprising a hollow body including inlet and outlet ports, a partition within the body for separating the ports and having an opening therein formed with the valve seat, a bonnet secured to the body and having a valve seat formed thereon, said bonnet having a drain vent therein above its seat, a stem mounted in the bonnet and extending into the body, a valve head including a ring like body having an interiorly threaded recess in the lower end thereof, an exteriorly threaded collar rising from the ring like body and surrounding the stem, a gasket surrounding the collar and seated in the upper end of the ring like body, a threaded stud formed on the lower end of the stem and disposed in the recess, said stud having diametrically opposed flat faces thereon, a washer on the stud and fitting the faces and providing a bearing for the ring like body, a nut threaded on the stud and securing the valve head on the stem for swivel movement, a nipple member including a threaded annular flange threaded in the recess to close the same, a stud depending from the nipple member and having an enlarged inner end, a gasket surrounding the enlarged inner end and seated in the nipple member, means securing the gaskets seated and threaded to the collar and the latter stud respectively, and the first gasket being engageable with the seat of the partition, and the other with the seat of the bonnet.

JOHN M. SUMMERS.